United States Patent [19]
Takahashi et al.

[11] Patent Number: 6,055,131
[45] Date of Patent: *Apr. 25, 2000

[54] MAGNETIC HEAD SUSPENSION HAVING SELECTED THICKNESSES FOR ENHANCING RIGIDITY

[75] Inventors: Haruhide Takahashi; Shuichi Sugahara; Masaaki Matsumoto, all of Odawara, Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,326

[22] Filed: Nov. 26, 1997

[30] Foreign Application Priority Data

Nov. 28, 1996 [JP] Japan .................................. 8-317508

[51] Int. Cl.[7] ........................................................ G11B 5/48
[52] U.S. Cl. ................................................................ 360/104
[58] Field of Search ............................................. 360/104

[56] References Cited

U.S. PATENT DOCUMENTS 5,461,525 10/1995 Christianson ........................ 360/104
5,844,751 12/1998 Bennin .................................. 360/104
5,946,164 8/1999 Tracy .................................... 360/104

FOREIGN PATENT DOCUMENTS 6-215513 8/1994 Japan .

OTHER PUBLICATIONS

T. Ohwe et al, "A New Integrated Suspension for Pico–Sliders (PICO–CAPS)"; 1996 IEEE.

*Primary Examiner*—A. J. Heinz
*Attorney, Agent, or Firm*—Beall Law Offices

[57] ABSTRACT

A magnetic head suspension for a magnetic memory apparatus includes a load arm having a head arm portion and a carriage arm portion that is thicker than the head arm portion. The load arm may include a first plate as the head arm portion, and a second plate attached to the first plate as the carriage arm portion. A magnetic head slider attaching part is gimbaled to the first plate, and is formed from the material of the first plate. The first plate is provided with a loading bend in an intermediate portion thereof to provide an added pushing force to the magnetic head toward the magnetic disk. A conductor layer is patterned in the underside of the first plate, to transfer signals to and from the head.

57 Claims, 5 Drawing Sheets

MAGNETIC HEAD SUSPENSION HAVING SELECTED THICKNESSES FOR ENHANCING RIGIDITY

BACKGROUND OF THE INVENTION

1. Field of the Invention

The present invention relates generally to magnetic memory apparatus employing hard disk drives, and, more particularly, to magnetic head suspensions for use in magnetic memory apparatus.

2. Description of the Related Art

In a magnetic head suspension, a magnetic head slider may be attached to a gimbal made of a relatively thin material, whereby the magnetic head slider can swing somewhat freely. To increase the pushing load to the magnetic head slider, which is fixed to the gimbal, the gimbal in turn is fixed to a load arm that is bent at a midpart thereof and supported by a dimpled part.

The gimbal and load arm have been previously constructed as distinct members. A drawback to this design is that the dimpled part supports the gimbal, such that the gimbal is displaced against the load arm. As a result, the magnetic head slider cannot have a high positioning accuracy.

Japanese Unexamined Patent Application Laid-Open No. 6-215513 describes a suspension having a unitary gimbal and load arm, and signal lines for the magnetic head that are formed on a surface of the suspension. To permit the slider to swing freely and to reduce the stiffness of the gimbal, the whole suspension is fabricated from thin sheet metal.

When the gimbal and the load arm are unitary, there is no problem of relative displacement between the gimbal and the load arm. However, the thin plate that reduces the stiffness of the gimbal also reduces the lateral stiffness of the suspension. Thus, the suspension may be deformed beyond the surface plane during operation, which lowers the positioning accuracy when the suspension is under a pushing load.

SUMMARY OF THE INVENTION

An objective of the present invention is to improve the positioning accuracy of a magnetic head suspension of a magnetic memory apparatus.

To solve the problems described above and to achieve the stated objective, the load arm is formed from a plate material, and the gimbal that supports the magnetic head slider is formed at one end of the load arm. A loading bend is formed at a central portion of the load arm for increasing the load to the magnetic head slider so as to push the head toward the magnetic medium; the loading bend represents a boundary defining a "head arm portion" of the load arm and a "carriage arm portion" of the load arm. Conductors are formed on the surface of the load arm to transfer signals to and from the magnetic head. The suspension is fixed to and supported by a carriage through a base plate at the other end of the load arm. In turn, the carriage is pivotably fixed to a positioning actuator, as is known. The carriage arm portion of the load arm (i.e., the portion of the load arm on the carriage side of the loading bend, which is fixed to the carriage) is thicker than the head arm portion of the load arm (i.e., the portion of the load arm on the head side of the loading bend, to which the gimbal is connected) at at least one portion thereof.

The load arm preferably comprises first and second plates, wherein the gimbal and the loading bend are formed from and in the first plate, respectively, and the second plate is fixed to the first plate at the carriage arm portion of the load arm. By this configuration, a load arm having more than one thickness can be formed easily.

DETAILED DESCRIPTION OF THE PREFERRED EMBODIMENTS

The configuration of a magnetic head suspension constructed according to a first preferred embodiment of the present invention, and the configuration of a magnetic memory apparatus that uses the suspension, will be explained with reference to FIGS. 1–5.

Figure 1:
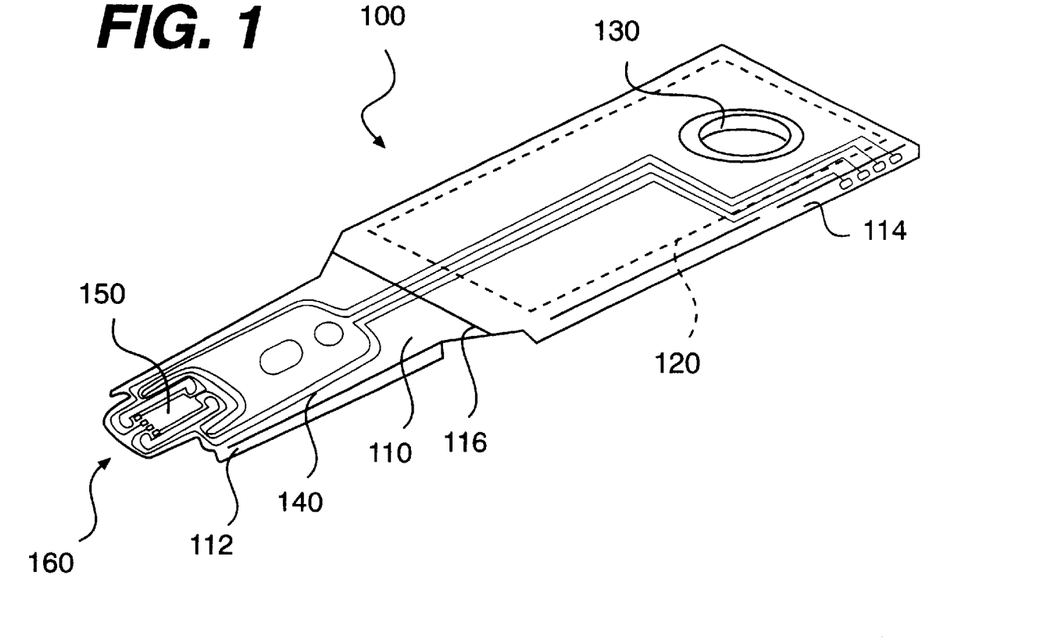
FIG. 1 is an oblique bottom view of a magnetic head suspension constructed according to a first preferred embodiment of the present invention.

As shown in FIG. 1, the magnetic head suspension 100 of the first embodiment includes a first plate 110 and a second plate 120. The second plate 120 is preferably spot-welded to the first plate 110, although an adhesive bond may be used instead of a weld. A base plate 130 is welded to the first plate 110 through the second plate 120. The base plate 130 is used for fixing the suspension 100 to the carriage of the magnetic memory apparatus, as is described later.

The first plate 110 is formed from a plate material having any uniform thickness between 20 $\mu$m–40 $\mu$m ($\pm$1–2 $\mu$m), preferably. By way of example, a stainless steel plate having a thickness of 25 $\mu$m may be used. A magnetic head slider attaching part 150 is formed from the first plate 110 at one end thereof and connected to the first plate 110 via a gimbal 160, which is also preferably formed from the first plate.

A conductor layer 140 is formed by patterning on the surface of the first plate 110. In the illustrated embodiment, the conductor layer 140 extends from the magnetic head slider attaching part 150 to the end of the carriage arm portion of the load arm, at which the base plate 130 is located. The conductor layer 140 is electrically insulated from the first plate 110 by a structure that is described later with reference to FIG. 4. The conductor layer is used for transferring signals to and from a magnetic transducer (head) arranged on a magnetic head slider that is fixed to the magnetic head slider attaching part 150.

By etching or press-punching the first plate 110 with the patterning of the conductor layer 140, the two-dimensional shape of the magnetic head suspension 100 is formed. Thus, the magnetic head slider attaching part 150 is formed as a unit with the suspension 100. The magnetic head slider attaching part 150 is supportedly connected to the load arm by the gimbal 160, the details of which will be explained below with reference to FIG. 2.

The second plate 120 may also be made from the same plate material as that of the first plate, but preferably has a uniform thickness having any value between 25 $\mu$m–100 $\mu$m (±1–2 $\mu$m). By way of example, a stainless steel plate having a thickness of 64 $\mu$m is suitable as the second plate 120. As for the first plate 110, the two-dimensional shape of the second plate 120 is formed by etching or press-punching.

Figure 3:
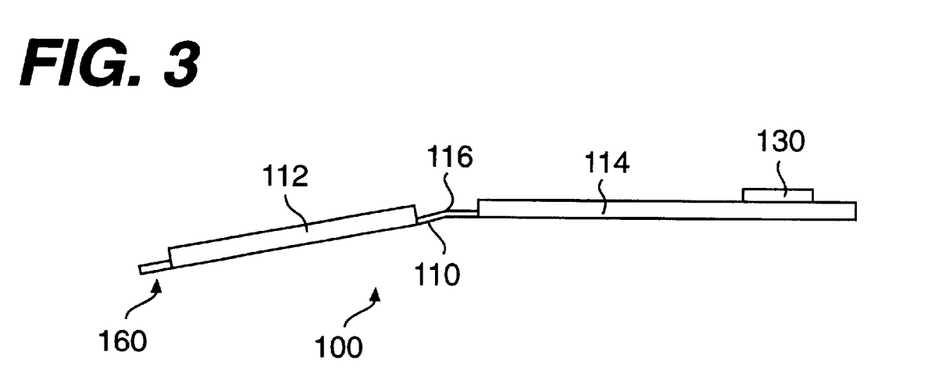
FIG. 3 is a side view of the magnetic head suspension shown in FIG. 1.

As shown in FIG. 3, to stiffen the load arm, the first plate 110 is bent on both lateral sides thereof, in the head arm portion at 112 and in the carriage arm portion at 114 in the present embodiment. A loading bend 116 is arranged between the stiffening bends 112, 114, and defines a border between the head arm portion and carriage arm portion. The loading bend 116, is perpendicular to the axial length of the load arm, and provides added pushing force to the head during operation. The loading bend has an angle that is determined by the desired loading force; by way of example, for a loading force below 1.5 g, a loading bend of about 10° is appropriate.

More particularly, if a load is imparted to the magnetic head suspension 100 during operation of the magnetic memory apparatus, the load arm would tend to deform in the direction outside of the surface plane if the suspension were to be constituted by the first plate 110 alone, due to the low stiffness of the thin plate material. Because the second plate 120 is fixed to the first plate 110 on the carriage arm portion, though, the load arm has a carriage arm portion that is effectively thicker than its head arm portion. Thus, the stiffness of the carriage arm portion is enhanced to effect that of a carriage arm portion that is 89 $\mu$m thick. The lateral stiffness of the load arm is therefore increased and its vibration characteristics are improved by the increase in the resonance frequency and the prevention of torsional vibration, the end result of which is an improvement in the accuracy of positioning the head.

The configuration of the magnetic head suspension 100 as viewed from above is explained next, with reference to FIG. 2. The same symbols as those used in FIG. 1 indicate the same parts.

Figure 2:
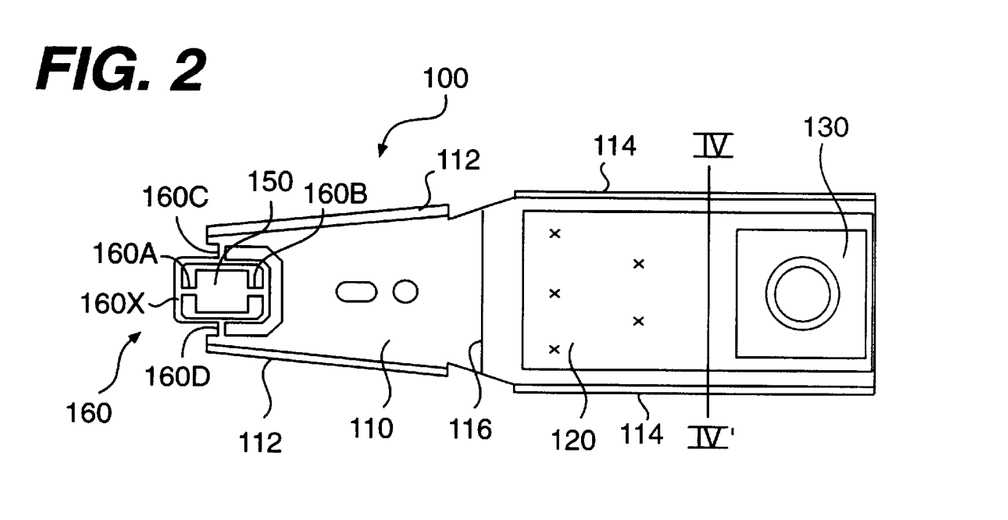
FIG. 2 is a top view of the magnetic head suspension shown in FIG. 1.

As illustrated in FIG. 2, the magnetic head slider attaching part 150 is formed by press-punching the first plate 110 at the head end of the magnetic head suspension 100. The magnetic head slider attaching part 150 is supported by the first plate 110 via the gimbal 160. The gimbal 160 includes a rectangular beam 160X formed around the magnetic head slider attaching part 150. The magnetic head slider attaching part 150 is connected to the rectangular beam 160X by a pair of first beams 160A and 160B, and the rectangular beam 160X is connected to the first plate 110 by a pair of second beams 160C and 160D. A magnetic head slider (not shown) is attached and fixed to the magnetic head slider attaching part 150.

The magnetic head slider that is attached to the magnetic head slider attaching part 150 can swing in the direction of CSS (contact start-stop, the sliding contact between the magnetic head slider and the magnetic disk at the start and stop of the magnetic memory apparatus) by the torsion of the second beams 160C and 160D. The magnetic head slider swings in the "seek" direction by torsion of the pair of first beams 160A and 160B. Thus, the magnetic head slider is supported movably for swing motion in two directions by the gimbal 160 that comprises the rectangular beam 160X and the two pairs of beams 160A, 160B, and 160C, 160D.

As mentioned above, a suitable thickness for the first plate 110 is 25 $\mu$m. Thus, since the stiffness of the first plate 110 is low, the magnetic head slider can be supported movably for swinging in two directions by the torsion of the gimbal 160. On the other hand, the greater stiffness of the head arm portion afforded by the stiffening bends 112 is desirable and, by making the stiffening bends 112 in the head arm portion, the stiffness of the load arm can be increased to great advantage.

The equivalent mass of the magnetic head suspension added to the mass of the floating magnetic head slider is affected most by the parts that are close to the magnetic head slider, such as the gimbal 160, the magnetic head slider attaching part 150, and the head arm portion. Therefore, by making these parts smaller, the equivalent mass is reduced and the uniformity of the floating space of the magnetic head slider over a fluctuating disk surface is improved.

Figure 4:
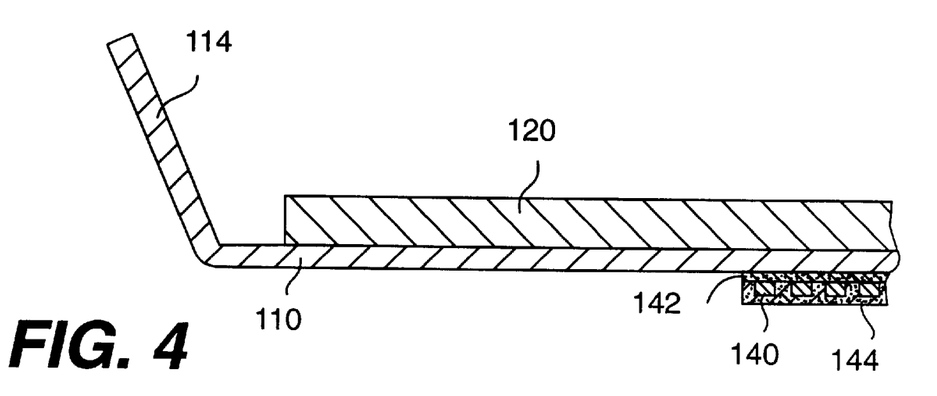
FIG. 4 is a partial cross-section taken along line IV–IV' FIG. 2.

The insulating structure of the conductor layer will be explained next with reference to FIG. 4.

An insulating layer 142, the conductor layer 140, and a cover layer 144 are patterned and laminated on the first plate on the opposite surface from the surface on which the second plate 120 is fixed. Preferably, the insulating layer 142 and the cover layer 144 are polyimide layers. The conductor layer 140 is insulated by the insulating layer 142 and the cover layer 144 from the first plate 110 and from the outside.

Figure 5:
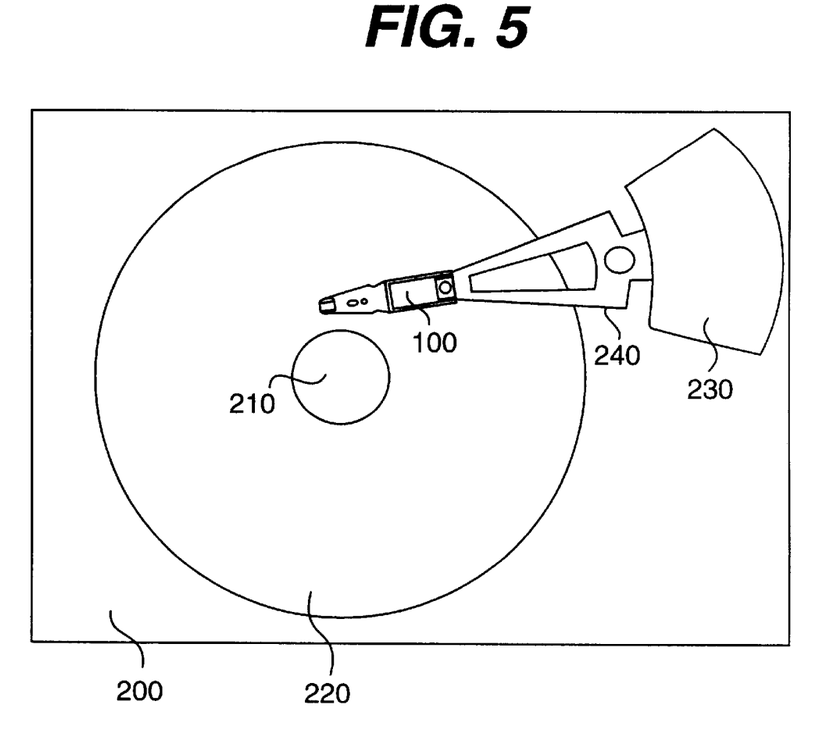
FIG. 5 is a top view of a magnetic memory apparatus that employs a magnetic head suspension constructed according to the present invention.

The configuration of a magnetic memory apparatus that uses the magnetic head suspension of the preferred embodiments of the present invention is explained next with reference to FIG. 5, which is a schematic top view of the apparatus.

The magnetic memory apparatus 200 is shown as the preferred example that uses a 3.5-inch magnetic disk. The apparatus comprises the 3.5-inch magnetic disk 220 mounted on a spindle 210, which rotates at a speed of 7200 rpm, and a positioning actuator 230. The positioning actuator 230 mounts a carriage 240 that is driven to swing the magnetic head suspension 100 that is attached to the edge of the carriage 240.

Air flow is generated in the circumferential direction of the rotating magnetic disk 220, which illustratively rotates at the speed of 7200 rpm. The positioning actuator 230 swings the carriage 240 and suspension 100 to position the magnetic head on a predetermined track between the inner and outer circumferences of the magnetic disk 220.

To perform a read or write operation, the magnetic head is pushed to the surface of the magnetic disk 220 under a predetermined load by the magnetic head suspension 100. By the air flow generated by the rotating disk, the magnetic head slider floats above the surface of the magnetic disk 220 at a flying height on the order of tens of nanometers. The slider is positioned by the positioning actuator 230 over the magnetic disk 220 in a radius range of approximately 20 to 46 mm with high precision.

Figure 7:
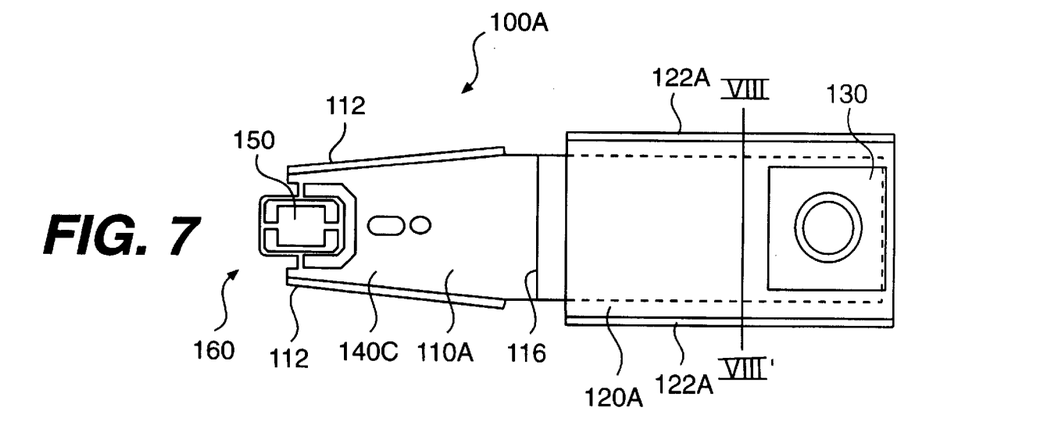
FIG. 7 is a top view of the magnetic head suspension shown in FIG. 6.
Figure 8:
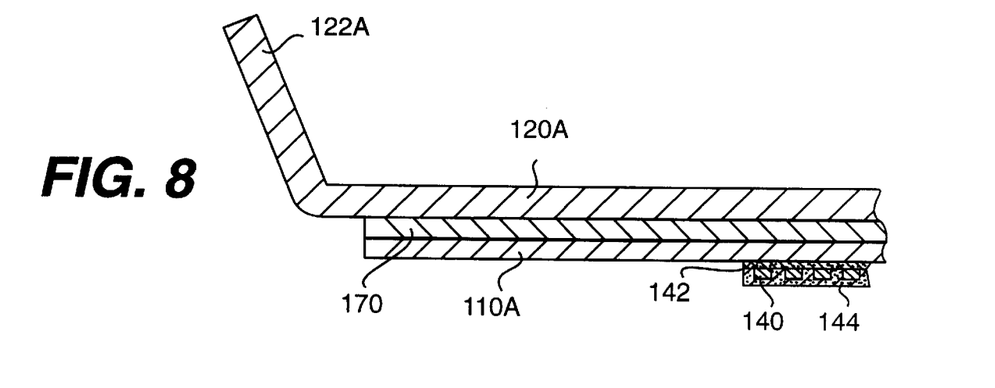
FIG. 8 is a partial cross-section taken along lines VII-I–VIII' in FIG. 7.

The configuration of a magnetic head suspension constructed according to a second preferred embodiment of the present invention will be explained next with reference to FIGS. 6–8.

The magnetic head suspension 100A according to this second embodiment comprises a load arm having a first plate 110A and a second plate 120A that is fixed to the first plate 110A by an adhesive. The structure of adhesion is explained later with reference to FIG. 8. Alternatively, the second plate 120A may be welded to the first plate 110A as in the first embodiment. The base plate 130 is welded to the first plate 110A through the second plate 120A. As in the first embodiment, the base plate 130 is used for fixing the magnetic head suspension 100A to the carriage of the magnetic memory apparatus.

The first plate 110A is made from a plate material of uniform thickness, preferably having any value between 20 μm–40 μm (±1–2 μm). In a preferred form, the plate material is a stainless steel sheet having a thickness of 25 μm.

As in the first embodiment, the magnetic head attaching part 150 is formed at the end of the first plate 110A using a punching press. The magnetic head slider attaching part 150 is supported by the first plate 110A via the gimbal 160.

The conductor layer 140 is formed on the surface of the first plate 110A by patterning. In this embodiment, the conductor layer 140 is formed from the magnetic head attaching part 150 to near the base plate 130 at the opposite end of the magnetic head suspension 100A. The conductor layer 140 is insulated from the first plate 110A, details of which are explained later with reference to FIG. 8. The conductor layer 140 transfers signals to and from the magnetic head.

The two-dimensional form of the magnetic head suspension 100A is formed by etching or punching the first plate 110A that is provided with the patterning of the conductor layer 140. In this process, the magnetic head attaching part 150 is formed together with the first plate 110A as a unit.

The second plate 120A is made of a plate material having a uniform thickness of 25 μm to 100 μm. In this case, a stainless steel sheet having a thickness of 64 μm is used. Similar to the case with the first plate 110A, the two-dimensional shape is formed by etching or punch-pressing.

The head arm portion of the first plate 110A is provided with the stiffening bends 112 on both sides thereof, as in the first embodiment. The first plate 110A is also provided with the loading bend 116 at a right angle to the long axis of the load arm, between the head arm portion and the carriage arm portion.

In this second embodiment, however, the second plate 120A is provided with stiffening bends 122A on both sides thereof. The stiffening bends 122A correspond to the stiffening bends 114 of the first embodiment of the present invention illustrated in FIG. 1, in that they are located in the carriage arm portion of the load arm. However, the first embodiment locates the stiffening bends 114 in the first plate 110.

Figure 6:
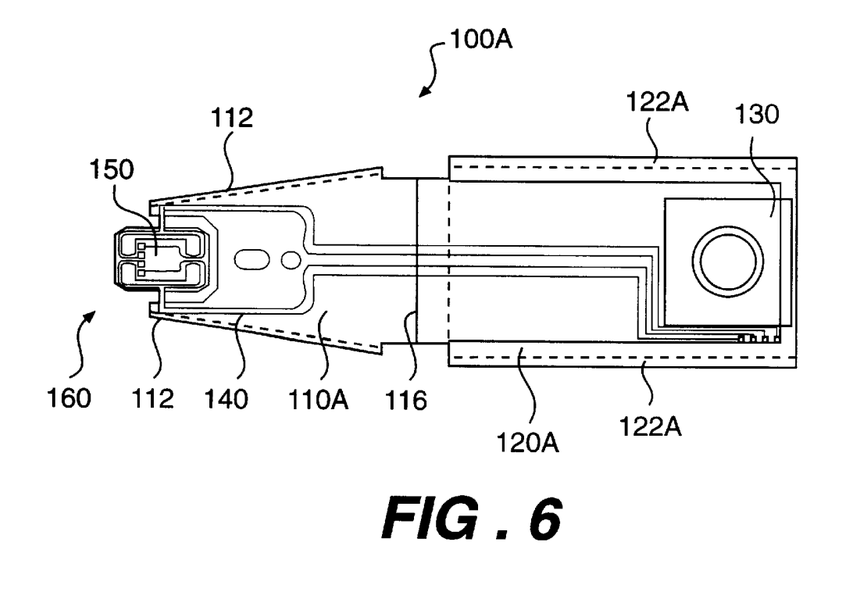
FIG. 6 is a bottom view of a magnetic head suspension constructed according to a second preferred embodiment of the present invention.

If the second plate containing the stiffening bends 122A is thicker than the first plate 110A, then the first plate may be fashioned to be parallel to the long axis of the load arm at the point of the loading bend 116, as shown in FIG. 6. The embodiment shown in FIG. 2 illustrates a possible configuration of the first plate 110 in which the corresponding portion is oblique to the long axis, due to the stiffening bends 114 being provided in the first plate in that embodiment. However, if it proves suitable, either configuration of the first plate (i.e., whether parallel to the long axis or oblique to the long axis) may be employed in any of the disclosed embodiments.

The configuration of the magnetic head suspension 100A viewed from the back side is explained with reference to FIG. 7. Symbols that are the same as those shown in FIG. 6 refer to the same parts.

The second plate 120A is preferably fixed with an adhesive to the carriage arm part of the first plate 110A. For example, the adhesive may be an epoxy glue or any other suitable adhesive, for this or any of the disclosed embodiments. The base plate 130 is preferably welded to the first plate 110A through the second plate 120A. The base plate 130 is used for fixing the magnetic head suspension 100A to the carriage of the magnetic memory apparatus.

As explained above with respect to the first embodiment, the thin plate material (e.g., 25 μm thick) used to form the first plate 110A is not very stiff. Thus, if the load arm were to be constituted of only the first plate 110A, the load arm would deform out of the surface plane when the load is applied to the suspension. By fixing the second plate 120A to the first plate 110A on the carriage arm portion of the first plate 110A, the stiffness of the carriage arm portion of the load arm is enhanced to be similar to the stiffness of a first plate having a thickness of 89 μm. The lateral stiffness of the load arm is thus increased and the vibration characteristics are improved. On the other hand, when the lateral stiffness of the load arm is low, the resonance frequency is decreased and first and second torsion mode vibration is generated. The increase of the lateral stiffness of the load arm increases the resonance frequency and prevents the generation of the torsional vibration, improving the positioning accuracy of the head.

The stiffening bends 112 provide the head arm portion with added stiffness, desirable because the first plate 110A constitutes the head arm portion, and is, for example, 25 μm thick to provide a thin gimbal 160. Similarly, the stiffening bends 122A provide added stiffness to the second plate 120A and the carriage arm portion of the load arm. Moreover, the increased stiffness due to the stiffening bends 122A in the second embodiment makes the load arm more stiff than that of the first embodiment in which the stiffening bends 114 were formed in the first plate 110, because the second plate 120A is thicker than the first plate 110. Therefore, the vibration characteristics are improved further.

The insulating structure of the conductor layer is explained with reference to FIG. 8, next.

On the surface opposite to that on which the second plate 120A is fixed to the surface of the first plate 110A, an insulating layer 142 (preferably polyimide), the conductor layer 140, and a polyimide cover layer 144 (also preferably polyimide) are laminated in sequence by patterning. The conductor layer 140 is insulated against the first plate 110A and from the outside by the insulating layer 142 and the cover layer 144. The second plate 120A is fixed to the first plate 110A by an adhesive 170.

As in the first embodiment, the equivalent mass of the magnetic head suspension that is added to the mass of the floating magnetic head slider is largely affected by the parts of the suspension that are nearer to the magnetic head slider from the loading bend, such that by making these parts smaller, the equivalent mass is reduced and the uniformity of the floating space above the fluctuating disk surface is improved.

Figure 9:
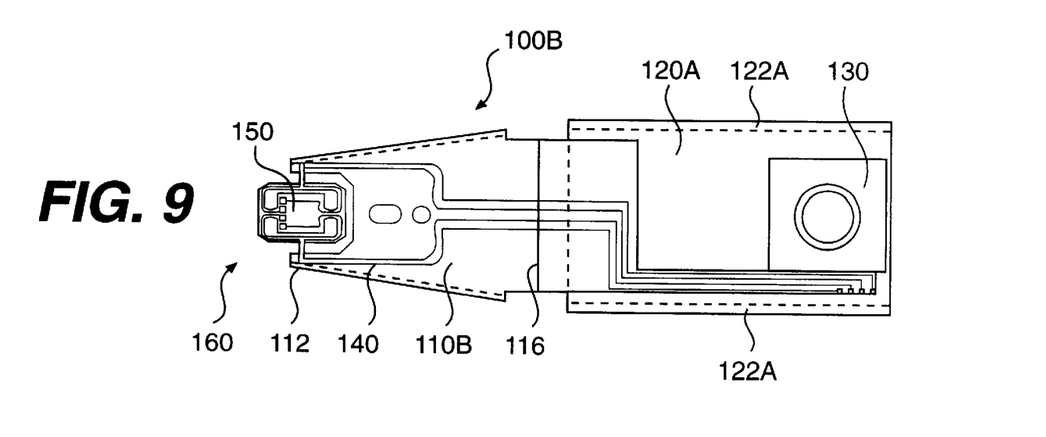
FIG. 9 is a bottom view of a magnetic head suspension constructed according to a third preferred embodiment of the present invention.

The configuration of a magnetic head suspension according to a third preferred embodiment of the present invention is explained using FIG. 9, in which symbols that are the same as those of FIG. 6 refer to the same parts.

In FIG. 9, the magnetic head suspension 100B is different from the magnetic head suspension 100A of the second embodiment illustrated in FIG. 6 in the shape of the first plate 110B. More particularly, the first plate 110B is shorter than the first plate shown in FIG. 6. The first plate 110B is fixed to the second plate 120A by welding or adhesive. By making the total length of the first plate 110B shorter, the first plate 110B becomes lighter, and, as a result, the magnetic head suspension 100B itself becomes lighter. Therefore, the positioning accuracy of the magnetic head suspension and the magnetic memory apparatus that uses it is further improved.

As explained above, the lateral stiffness of the load arm considering only the first plate 110B is insufficient, but, by adding the second plate 120B to the first plate 110B, the stiffness of the carriage arm portion is improved and the lateral stiffness of the whole load arm is improved. Nevertheless, since the thin material of the first plate is the source of the gimbal, the stiffness of the gimbal is desirably low.

Also as discussed above, the equivalent mass of the magnetic head suspension that is added to the mass of the floating magnetic head is largely affected by the parts nearest the magnetic head slider attaching part, such that by making those parts smaller, the equivalent mass is reduced and the uniformity of the floating space with respect to the fluctuating disk surface is improved.

With this preferred embodiment of the present invention, the positioning accuracy of the magnetic head suspension and the magnetic memory apparatus that uses it is further improved.

The configuration of a magnetic head suspension according to a fourth preferred embodiment of the present invention is explained next, with reference to FIG. 10.

Figure 10:
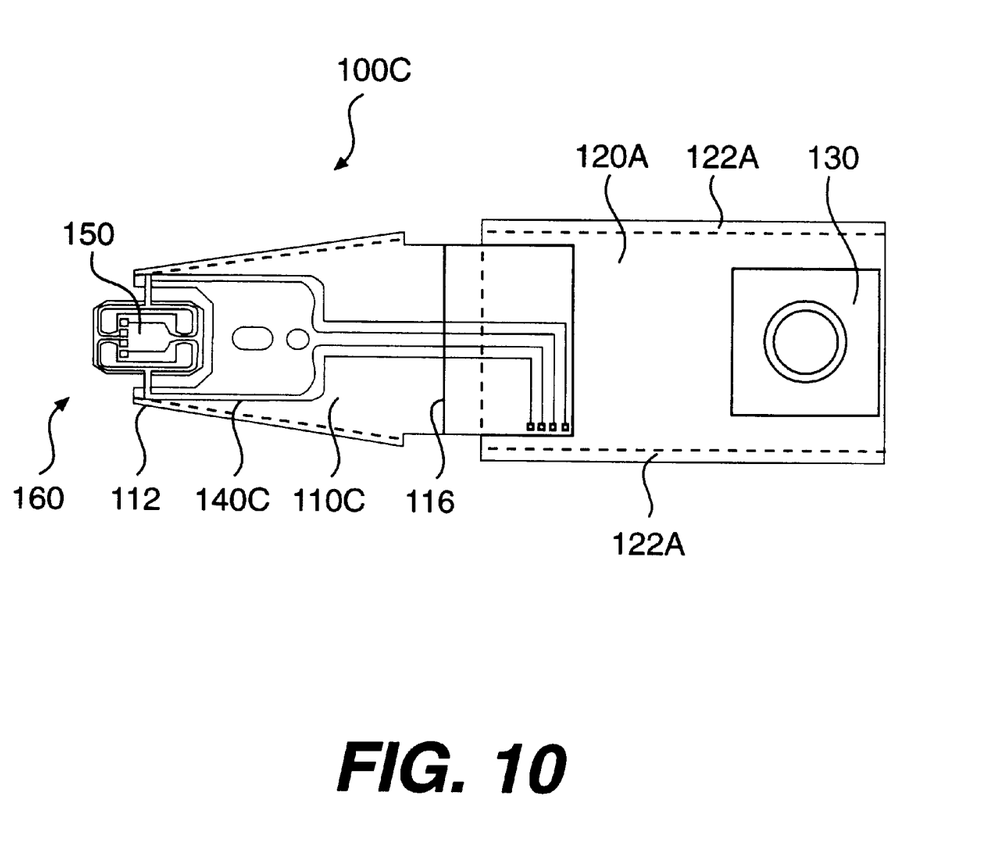
FIG. 10 is a bottom view of a magnetic head suspension constructed according to a fourth preferred embodiment of the present invention.

FIG. 10 is a bottom view of a magnetic head suspension constructed according to the fourth preferred embodiment of the present invention. Symbols that are the same as the symbols shown in FIG. 9 refer to the same parts.

In FIG. 10, the magnetic head suspension 100C is different from the magnetic head suspension of the third embodiment illustrated in FIG. 9 in the shape of the first plate 110C. More particularly, the first plate 110C is shorter than the first plate 110B shown in FIG. 9. Moreover, the position of the signal output of the conductor layer 140C is changed.

By making the total length of the first plate 110C shorter, the first plate 110C becomes lighter. As a result, the magnetic head suspension 100C itself becomes lighter. Therefore, the positioning accuracy of the magnetic head suspension, and the magnetic memory apparatus that uses the suspension, are further improved.

The present embodiment has another advantage in that, since the total length of the first plate is shorter than the length of the first plate 110B shown in FIG. 9, the area of the pattern of the conductor layer 140C can be made smaller. Moreover, many of the smaller first plates 110C can be formed from a single large sheet of the plate material having the desired thickness; this fact combined with the smaller area for patterning results in reduced manufacturing costs.

By attaching the second plate 120C to the first plate 110C, the stiffness of the carriage arm portion is improved and, consequently, the lateral stiffness of the load arm is improved. At the same time, since the gimbal 160 is fabricated from the material of the first plate 110C, the stiffness of the gimbal is kept desirably low. And, as in the previous embodiments, the equivalent mass is reduced while the uniformity of the floating space above a fluctuating disk surface is improved. Thus, the positioning accuracy of the magnetic head suspension of the present embodiment and the magnetic memory apparatus that employs it is further improved.

In each of the above preferred embodiments of the invention, the stiffness of the load arm is increased by effectively thickening the carriage arm portion by fixing the second plate to the first plate. Alternatively, the sheet of plate material from which the first plate is fabricated can be fashioned so that it is sufficiently thicker by itself in the carriage arm portion than in the head arm portion. Then, the second plate can be omitted without losing the advantages described above. For example, by preparing a plate material having a thickness of 89 m and working by half-etching part of the plate material to a thickness of 25 μm to form the head arm portion, with appropriate processing to form other necessary parts as described (e.g., the gimbal, the magnetic head slider attaching part, the conductor layer, etc.), it is possible to make a magnetic head suspension having a configuration like those of the embodiments described above.

Various modifications of the embodiments described above will be readily apparent to those of ordinary skill in the art. All such modifications that basically rely upon the teachings through which the invention has advanced the state of the art are properly considered within the spirit and scope of the invention.

We claim:

1. A suspension for a magnetic head, comprising:

a load arm having a head arm portion, a carriage arm portion, and a loading bend between the head arm portion and the carriage arm portion; the head arm portion extending between the loading bend and a distal end of the suspension to which the magnetic head is attached; the head arm portion and loading bend being formed to have a substantially uniform thickness overall;

wherein the carriage arm portion has a base region defined by a base plate affixed thereto for fixing the suspension to a carriage; and wherein the carriage arm portion is thicker at at least one location thereof than the head arm portion at all locations thereof, said at least one location of said carriage arm portion being exclusive of said base region.

2. A suspension for a magnetic head as claimed in claim 1, further comprising a gimbaled head support at an end of the head arm portion.

3. A suspension for a magnetic head as claimed in claim 2, wherein the load arm comprises a first plate that includes both the head arm portion and the carriage arm portion, the carriage arm portion includes a second plate fixed to the first plate, and the loading bend is formed in the first plate.

4. A suspension for a magnetic head as claimed in claim 3, wherein the carriage arm portion has a stiffening bend in the second plate.

5. A suspension for a magnetic head as claimed in claim 3, wherein the gimbaled head support is formed from the head arm portion of the first plate.

6. A suspension for a magnetic head as claimed in claim 3, wherein the second plate is welded to the first plate.

7. A suspension for a magnetic head as claimed in claim 6, wherein the second plate is bonded to the first plate by an adhesive.

8. A suspension for a magnetic head as claimed in claim 3, further comprising electrical conductors on the head arm portion of the first plate and on the carriage arm portion of the first plate, and output terminals on the carriage arm portion and electrically connected to the electrical conductors;

wherein the second plate has a surface area that is less than that of the carriage portion of the first plate.

9. A suspension for a magnetic head as claimed in claim 3, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and     wherein the carriage arm portion of the first plate includes a first portion that extends only part of the length of the second plate, and a second portion that extends substantially the length of the second plate, the output terminals being located near an end of the second portion opposite the loading bend.

10. A suspension for a magnetic head as claimed in claim 9, wherein the first portion extends less than half the length of the second plate.

11. A suspension for a magnetic head as claimed in claim 3, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and     wherein the carriage arm portion of the first plate extends only part of the length of the second plate, the output terminals being located near an end of the carriage arm portion of the first plate opposite the loading bend.

12. A suspension for a magnetic head as claimed in claim 11, wherein the carriage arm portion of the first plate extends less than half the length of the second plate.

13. A suspension for a magnetic head as claimed in claim 1, wherein the load arm comprises a first plate that includes both the head arm portion and the carriage arm portion, the carriage arm portion includes a second plate fixed to the first plate, and the loading bend is formed in the first plate.

14. A suspension for a magnetic head as claimed in claim 3, wherein the carriage arm portion has a stiffening bend in the second plate.

15. A suspension for a magnetic head as claimed in claim 13, wherein the second plate is welded to the first plate.

16. A suspension for a magnetic head as claimed in claim 15, wherein the second plate is bonded to the first plate by an adhesive.

17. A suspension for a magnetic head as claimed in claim 13, further comprising electrical conductors on the head arm portion of the first plate and on the carriage arm portion of the first plate, and output terminals on the carriage arm portion and electrically connected to the electrical conductors;

wherein the second plate has a surface area that is less than that of the carriage portion of the first plate.

18. A suspension for a magnetic head as claimed in claim 13, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and     wherein the carriage arm portion of the first plate includes a first portion that extends only part of the length of the second plate, and a second portion that extends substantially the length of the second plate, the output terminals being located near an end of the second portion opposite the loading bend.

19. A suspension for a magnetic head as claimed in claim 18, wherein the first portion extends less than half the length of the second plate.

20. A suspension for a magnetic head as claimed in claim 13, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and     wherein the carriage arm portion of the first plate extends only part of the length of the second plate, the output terminals being located near an end of the carriage arm portion of the first plate opposite the loading bend.

21. A suspension for a magnetic head as claimed in claim 20, wherein the carriage arm portion of the first plate extends less than half the length of the second plate.

22. A magnetic memory apparatus including a rotatable hard magnetic disk, a magnetic head, a magnetic head positioning actuator including a suspension for the magnetic head, and a carriage to which the suspension is fixed through a base plate affixed to the suspension, the suspension comprising:

a load arm having a head arm portion, a carriage arm portion, and a loading bend between the head arm portion and the carriage arm portion;

wherein the carriage arm portion has a base region defined by the affixed base plate; and     wherein the carriage arm portion is thicker at at least one location thereof than the head arm portion at all locations thereof, said at least one location of the carriage arm portion being exclusive of said base region.

23. A magnetic memory apparatus as claimed in claim 22, further comprising a gimbaled head support at an end of the head arm portion.

24. A magnetic memory apparatus as claimed in claim 23, wherein the load arm comprises a first plate that includes both the head arm portion and the carriage arm portion, the carriage arm portion includes a second plate fixed to the first plate, and the loading bend is formed in the first plate.

25. A magnetic memory apparatus as claimed in claim 24, wherein the carriage arm portion has a stiffening bend in the second plate.

26. A magnetic memory apparatus as claimed in claim 24, wherein the gimbaled head support is formed from the head arm portion of the first plate.

27. A magnetic memory apparatus as claimed in claim 24, wherein the second plate is welded to the first plate.

28. A magnetic memory apparatus as claimed in claim 27, wherein the second plate is bonded to the first plate by an adhesive.

29. A magnetic memory apparatus as claimed in claim 24, further comprising electrical conductors on the head arm portion of the first plate and on the carriage arm portion of the first plate, and output terminals on the carriage arm portion and electrically connected to the electrical conductors;

wherein the second plate has a surface area that is less than that of the carriage portion of the first plate.

30. A magnetic memory apparatus as claimed in claim 24, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and wherein the carriage arm portion of the first plate includes a first portion that extends only part of the length of the second plate, and a second portion that extends substantially the length of the second plate, the output terminals being located near an end of the second portion opposite the loading bend.

31. A magnetic memory apparatus as claimed in claim 30, wherein the first portion extends less than half the length of the second plate.

32. A magnetic memory apparatus as claimed in claim 24, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and wherein the carriage arm portion of the first plate extends only part of the length of the second plate, the output terminals being located near an end of the carriage arm portion of the first plate opposite the loading bend.

33. A magnetic memory apparatus as claimed in claim 32, wherein the carriage arm portion of the first plate extends less than half the length of the second plate.

34. A magnetic memory apparatus as claimed in claim 22, wherein the load arm comprises a first plate that includes both the head arm portion and the carriage arm portion, the carriage arm portion includes a second plate fixed to the first plate, and the loading bend is formed in the first plate.

35. A magnetic memory apparatus as claimed in claim 34, wherein the carriage arm portion has a stiffening bend in the second plate.

36. A magnetic memory apparatus as claimed in claim 34, wherein the second plate is welded to the first plate.

37. A magnetic memory apparatus as claimed in claim 36, wherein the second plate is bonded to the first plate by an adhesive.

38. A magnetic memory apparatus as claimed in claim 34, further comprising electrical conductors on the head arm portion of the first plate and on the carriage arm portion of the first plate, and output terminals on the carriage arm portion and electrically connected to the electrical conductors;

wherein the second plate has a surface area that is less than that of the carriage portion of the first plate.

39. A magnetic memory apparatus as claimed in claim 34, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and wherein the carriage arm portion of the first plate includes a first portion that extends only part of the length of the second plate, and a second portion that extends substantially the length of the second plate, the output terminals being located near an end of the second portion opposite the loading bend.

40. A magnetic memory apparatus as claimed in claim 39, wherein the first portion extends less than half the length of the second plate.

41. A magnetic memory apparatus as claimed in claim 34, further comprising electrical conductors on the head arm portion of the first plate and on the carriage arm portion of the first plate, and output terminals on the carriage arm portion and electrically connected to the electrical conductors;

wherein the carriage arm portion of the first plate has a surface area that is less than that of the second plate; and wherein the carriage arm portion of the first plate extends only part of the length of the second plate, the output terminals being located near an end of the carriage arm portion of the first plate opposite the loading bend.

42. A magnetic memory apparatus as claimed in claim 41, wherein the carriage arm portion of the first plate extends less than half the length of the second plate.

43. A suspension for a magnetic head, comprising:

a load arm having a head arm portion, including a gimbal for attaching a magnetic head slider, a carriage portion including a base region for fixing the suspension to a carriage by a base plate, and a loading bend between the head arm portion and the carriage portion, wherein the load arm comprises a first plate that includes both the head arm portion and the carriage arm portion; and a second plate affixed to the carriage arm portion of the first plate for increasing stiffness of the suspension;

wherein the second plate has a surface area that is larger than that of the base plate and smaller than that of the carriage portion of the first plate.

44. A suspension for a magnetic head as claimed in claim 43, wherein the carriage arm portion has a stiffening bend in the second plate.

45. A suspension for a magnetic head as claimed in claim 43, further comprising electrical conductors on the head arm portion of the first plate and on the carriage arm portion of the first plate, and output terminals on the carriage arm portion and electrically connected to the electrical conductors.

46. A suspension for a magnetic head as claimed in claim 45, wherein the carriage arm portion of the first plate includes a first portion that extends only part of the length of the second plate, and a second portion that extends substantially the length of the second plate, the output terminals being located near an end of the second portion opposite the loading bend.

47. A suspension for a magnetic head as claimed in claim 46, wherein the first portion extends less than half the length of the second plate.

48. A suspension for a magnetic head as claimed in claim 43, further comprising electrical conductors on the head arm portion of the first plate and on the carriage arm portion of the first plate, and output terminals on the carriage arm portion and electrically connected to the electrical conductors; and wherein the carriage arm portion of the first plate extends only part of the length of the second plate, the output terminals being located near an end of the carriage arm portion of the first plate opposite the loading bend.

49. A suspension for a magnetic head as claimed in claim 48, wherein the carriage arm portion of the first plate extends less than half the length of the second plate.

50. A suspension for a magnetic head, comprising:
   a load arm having a head arm portion, including a gimbal for attaching a magnetic head slider, a carriage portion including a loading bend between the head arm portion and the carriage portion, wherein the load arm comprises a first plate that includes both the head arm portion and the carriage arm portion;
   a second plate overlapping and affixed to the carriage arm portion of the first plate for increasing stiffness of the suspension; and
   a base plate overlapping and affixed to the second plate to define a base region for fixing the suspension to a carriage.

51. A suspension for a magnetic head as claimed in claim 50, further comprising electrical conductors on the head arm portion of the first plate and on the carriage arm portion of the first plate, and output terminals on the carriage arm portion and electrically connected to the electrical conductors.

52. A suspension for a magnetic head as claimed in claim 50, wherein each of said overlapping is for a majority of the width of the suspension.

53. A suspension for a magnetic head as claimed in claim 52, further comprising electrical conductors on the head arm portion of the first plate and on the carriage arm portion of the first plate, and output terminals on the carriage arm portion and electrically connected to the electrical conductors.

54. A suspension for a magnetic head as claimed in claim 50, wherein each of said first and second plates is of uniform thickness.

55. A suspension for a magnetic head as claimed in claim 54, wherein each of said overlapping is for a majority of the width of the suspension.

56. A suspension for a magnetic head as claimed in claim 55, further comprising electrical conductors on the head arm portion of the first plate and on the carriage arm portion of the first plate, and output terminals on the carriage arm portion and electrically connected to the electrical conductors.

57. A suspension for a magnetic head as claimed in claim 54, further comprising electrical conductors on the head arm portion of the first plate and on the carriage arm portion of the first plate, and output terminals on the carriage arm portion and electrically connected to the electrical conductors.

* * * * *